2 Sheets—Sheet 1.

J. F. ADAMS,

Assignor to B. BROWER.

PERMANENT LETTER FILE.

No. 10,078

Reissued Apr. 4, 1882.

Attest;

Geo. H. Graham

Anthony N. Jasbera

Inventor,

John F. Adams, by Munn & Philipp

Attys.

J. F. ADAMS,

Assignor to B. BROWER.

PERMANENT LETTER FILE.

No. 10,078. Reissued Apr. 4, 1882.

Attest;

Geo. H. Graham

Anthony N. Jasbera

Inventor

John F. Adams, by Munn & Philipp

Att'ys.

UNITED STATES PATENT OFFICE.

JOHN F. ADAMS, OF IRVINGTON, ASSIGNOR TO BLOOMFIELD BROWER, OF NEW YORK, N. Y.

PERMANENT LETTER-FILE.

SPECIFICATION forming part of Reissued Letters Patent No. 10,078, dated April 4, 1882.

Original No. 169,665, dated November 9, 1875. Application for reissue filed September 30, 1881.

*To all whom it may concern:*

Be it known that I, JOHN F. ADAMS, of Irvington, in the county of Westchester and State of New York, have invented a new and useful Improvement in Letter and Paper Files; and I do hereby declare the following to be a full, clear, and exact description of the same, reference being had to the accompanying drawings, forming a part of this specification.

The object of my invention is to produce a letter or paper file in which the index or other sheets are adjustable, and which permit the introduction between any two of them of any desired number of papers, letters, &c., whose edges may reach to the back of the sheets, and yet permit the whole to lie smooth, however much the quantity between any two sheets may exceed that between any two other sheets; and my invention consists in the combination, with a box having a bottom, two sides, and a back, provided with a vertical groove or grooves, of a series of adjustable index or other sheets, made of card-board or suitable stiff paper, each sheet being attached to a piece of stiff material having a projection or projections fitting into the said groove or grooves, as will be hereinafter fully described and claimed; also, in certain other combinations of parts, hereinafter fully described and claimed.

Figure 1:
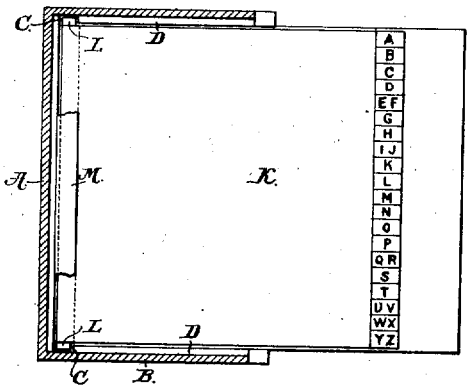
Figure 6:
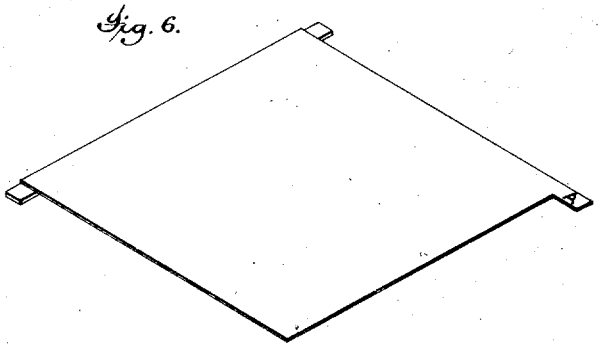
Figure 2:
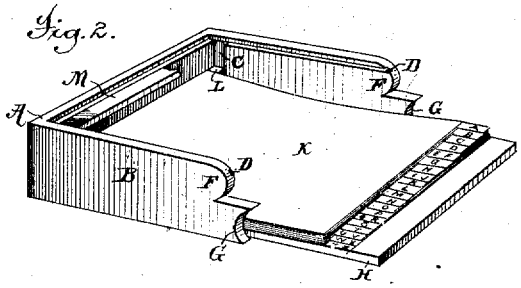
Figure 4:
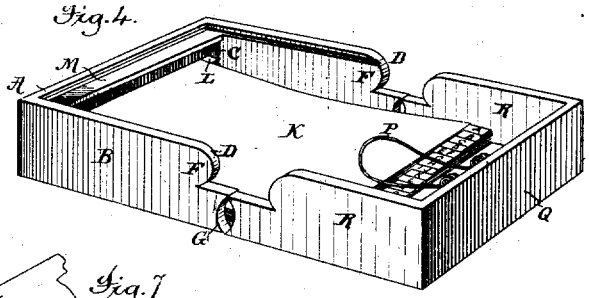
Figure 7:
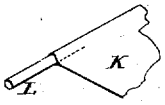
Figure 3:
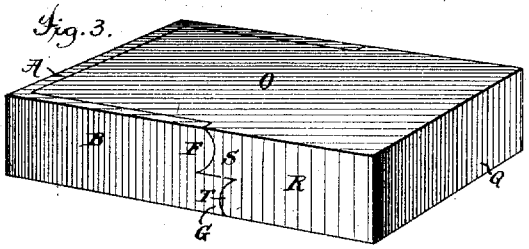
Figure 5:
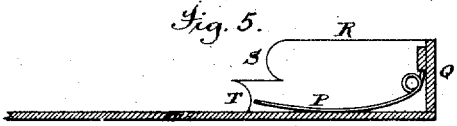

In the drawings, Figure 1 is a plan view, with portions broken away, of a file containing my invention with the cover removed. Fig. 2 is a perspective view of the same. Fig. 3 is a perspective view of a file containing my invention with the cover in place. Fig. 4 is a perspective view of a file containing my invention with the cover arranged for a purpose to be explained. Fig. 5 is a sectional view of the cover to which a spring forming a clip is secured. Fig. 6 is a perspective view of one of a series of index-sheets attached to a bar of wood having projections. Fig. 7 is a perspective view of a portion of one of a series of index-sheets secured to a piece of wire having projections, only one being shown, as part of the sheet is shown as cut away.

In the drawings, H is the bottom, B the sides, and A the back, of a box for holding a series of index-sheets and papers to be filed between them.

Contiguous to back A are vertical grooves C. The ends of the sides B are formed, as shown in the drawings, with projections F and recesses G.

The bottom H of the box is made of a width sufficient to permit ordinary letter-paper to be placed in between the sides sidewise and half-note sheets to be placed in endwise, two on a page; but it may be made of any width to adapt it to the papers to be filed.

Within the box is a series of sheets, K, made of card-board or suitable stiff paper, between which the letters, &c., are held. The outer end of each of these sheets may be marked with an appropriate letter of the alphabet or with other suitable designating character.

Each sheet K is attached to a piece of stiff material having a projection or projections. As shown in Fig. 6, this material to which the sheet is attached is a wire, which may extend part way or entirely across the end of the sheet, portions of such wire forming projections L; and as shown in Fig. 7, this material is a strip or bar of wood or other material, to which the sheet is attached, portions of said strip or bar forming projections L.

The sheets K are placed in a box formed by the bottom, two sides, and back, the projections L, before referred to, fitting in the grooves C, which prevents them from being pulled out, while allowing them to move freely vertically and independently of each other. A strip, M, is secured so as to close up the tops of such groove or grooves, shown in the drawings extending the whole width of the box. Instead of this, however, short strips can be used over the top of the groove or grooves for this purpose, the object being to prevent the sheets from being moved out of the grooves vertically. The form of the grooves C and that of the projections on the stiff material to which each sheet K is attached, fitting therein, may be varied any form which will prevent the sheets from, being withdrawn when in use being all that is essential for this purpose.

The cover of the file is composed of a top, O, having an end, Q, and sides R, the latter being provided with projections S and depressions T, as shown in the drawings, which correspond with and fit into the recess G and projections F of the sides B of the box. The top O fits in horizontal grooves D provided in the sides B of the box. This cover is provided with a spring, P, as shown in Figs. 3 and 4, which enables it be used as a convenient desk-clip when desired. When the top is slid into the grooves D the respective projections S and F and depressions T and G form a secure lock and prevent the box and cover from being separated by excess of papers within or from any other cause.

Under some circumstances, to prevent the letters, papers, &c., from falling out from between the adjustable sheets K, where they are placed, the top O of the cover may be inserted under the bottom H of the box and the spring P placed over the adjustable sheets, as shown in Fig. 4; or the top O may be placed under the bottom H while in use and the spring P under the sheets to hold the box and cover together. This, however, is not necessary, and a weight may be placed upon the sheets K when it is desired to use the cover as a desk-clip. When the file has been filled the top O of the cover is inserted into the groove D, as shown in Fig. 3, which gives the file a rectangular shape, convenient to be placed away, properly labeled for reference.

The projections and recesses on the ends of the sides B and R may be of any configuration which will enable the two to be secured together for the purpose specified, and the ends of the sides B may terminate in the middle thereof or at or near one end of the box, the sides R being adapted to them.

Having thus described my invention, what I claim as new, and desire to secure by Letters Patent, is—

1. The combination, with a box having a bottom, two sides, and a back, and provided with a vertical groove or grooves, of a series of adjustable sheets, made of card-board or suitable stiff paper, each sheet being attached to a piece of stiff material having a projection or projections fitting into said groove or grooves, substantially as and for the purpose described.

2. The combination of the cover provided with a spring, P, with a box having a bottom, two sides, and a back, and the series of adjustable sheets K, substantially as shown and described.

In testimony whereof I have hereunto set my hand in the presence of two subscribing witnesses.

JOHN F. ADAMS.

Witnesses:
GEO. H. GRAHAM,
E. M. JEROME.